(12) United States Patent
Wang et al.

(10) Patent No.: US 8,144,133 B2
(45) Date of Patent: Mar. 27, 2012

(54) DISPLAY DEVICE WITH TOUCH PANEL AND FABRICATING METHOD THEREOF

(75) Inventors: Yi-Ching Wang, Hsinchu (TW); Tzu-Ming Wang, Hsinchu (TW); Ted-Hong Shinn, Hsinchu (TW)

(73) Assignee: E Ink Holdings Inc., Hsinchu County (TW)

( * ) Notice: Subject to any disclaimer, the term of this patent is extended or adjusted under 35 U.S.C. 154(b) by 467 days.

(21) Appl. No.: 12/406,950

(22) Filed: Mar. 18, 2009

(65) Prior Publication Data

US 2010/0156841 A1    Jun. 24, 2010

(30) Foreign Application Priority Data

Dec. 24, 2008   (TW) ................................ 97150504 A

(51) Int. Cl.
*G06F 3/041*   (2006.01)

(52) U.S. Cl. ........... 345/174; 345/173; 345/87; 345/104

(58) Field of Classification Search ........................ None
See application file for complete search history.

(56) References Cited

U.S. PATENT DOCUMENTS 7,190,350 B2 *   3/2007   Roberts .......................... 345/173
2010/0127992 A1 *   5/2010   Schmid .......................... 345/173

FOREIGN PATENT DOCUMENTS

CN   101268435 A   9/2008

* cited by examiner

*Primary Examiner* — Muhammad N Edun
(74) *Attorney, Agent, or Firm* — Chun-Ming Shih

(57) ABSTRACT

A display device with touch panel and a fabricating method thereof are provided. The display device with touch panel includes a flexible display panel and a force sensitive touch panel. The force sensitive touch panel is disposed under a portion of the flexible display panel. Since the force sensitive touch panel is only configured under the portion of the flexible display panel, the display device with touch panel may have touching control function and flexibility at the same time.

9 Claims, 5 Drawing Sheets

DISPLAY DEVICE WITH TOUCH PANEL AND FABRICATING METHOD THEREOF

This application claims priority to a Taiwan application No. 097150504 filed Dec. 24, 2008.

BACKGROUND

1. Field of the Invention

The invention is related to a display device and fabricating method thereof, and more particular to a flexible display device with touch panel and fabricating method thereof.

2. Description of the Related Art

Since the back light module is replaced by the external light source for displaying in reflective display devices, the consumed energy may be reduced and the reflective display devices are suitable for being used in the portable electronic products. Thus, a touch panel is used in the display device of most portable electronic products for convenience nowadays.

The touch panels widely used within the display devices comprise resistive touch panels, capacitance touch panels and force sensitive touch panels. The resistive touch panel or the capacitance touch panel is disposed on the display surface of the display panel. For the reflective display device, the external light is transmitted into the display panel via the resistive touch panel or the capacitance touch panel and the light reflected by the display panel is also transmitted out of the the display panel via the resistive touch panel or the capacitance touch pane.

However, the transmittance of the resistive touch panel or the capacitance touch panel is only between 80% and 92%, so the brightness of the reflective display device is difficult to promote. Therefore, piezoelectric touch panel disposed under the display panel is used in most of the conventional reflective display devices to prevent the light reflected by the display panel from passing the piezoelectric touch panel, so the light energy loss may be decreased and the displaying brightness of the reflective display devices may also be increased. Nevertheless, since a rigid substrate is used as a carrier for the piezoelectric sensors of the piezoelectric touch panel, the conventional reflective display device with piezoelectric touch panel is unflexible and it is not consistent with the trend of miniaturization and the convenience of carrying of the modern display devices.

BRIEF SUMMARY

Accordingly, the invention is directed to a display device with touch panel having flexibility without sacrificing brightness.

The invention is directed to a method of fabricating a display device with touch panel for producing a flexible display device with touch panel without reducing the brightness thereof.

The invention provides a display device with touch panel comprising a flexible display panel and a force sensitive touch panel, wherein the force sensitive touch panel is disposed under a portion of the flexible display panel.

The invention provides a method of fabricating a display device with touch panel. First, a flexible display panel is provided. Next, a force sensitive touch panel is formed under a portion of the flexible display panel.

Since the force sensitive touch panel is disposed under a portion of the flexible display panel, the other portions of the flexible display panel without bonding with the force sensitive touch panel may be bent. Therefore, the display device with touch panel is flexible in the invention.

In order to make the aforementioned and other objects, features and advantages of the invention more comprehensible, some preferred embodiments accompanied with figures are described in detail below.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
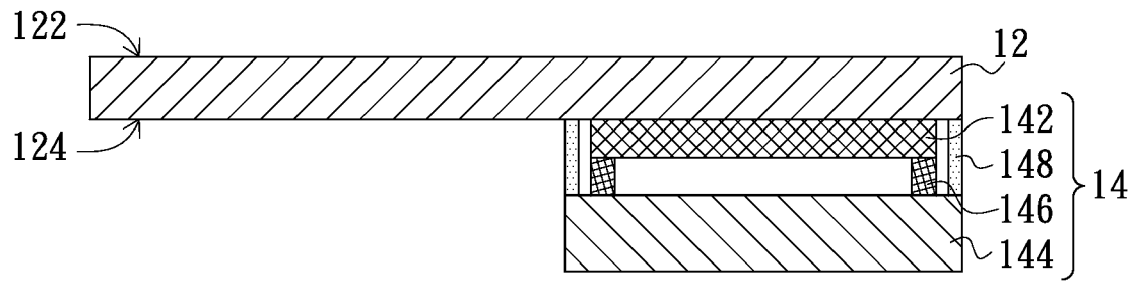
FIG. 1 is a schematic cross-sectional view illustrating a display device with touch panel according to an embodiment of the invention.
Figure 2A:
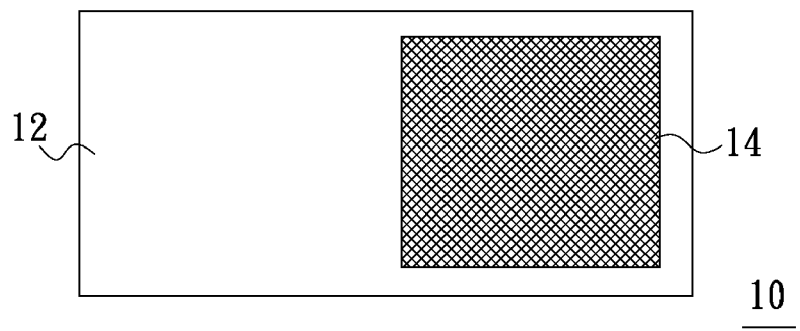
FIG. 2A is a schematic upward view illustrating a display device with touch panel according to an embodiment of the invention.
Figure 2B:
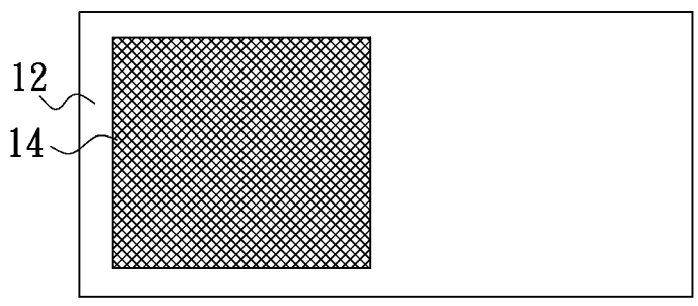
FIG. 2B is a schematic upward view illustrating a display device with touch panel according to another embodiment of the invention.
Figure 2C:
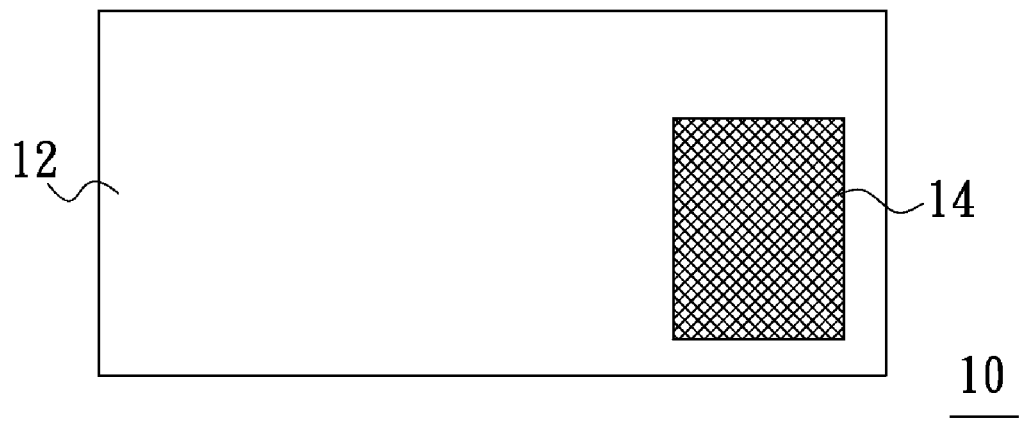
FIG. 2C is a schematic upward view illustrating a display device with touch panel according to another embodiment of the invention.
Figure 2D:
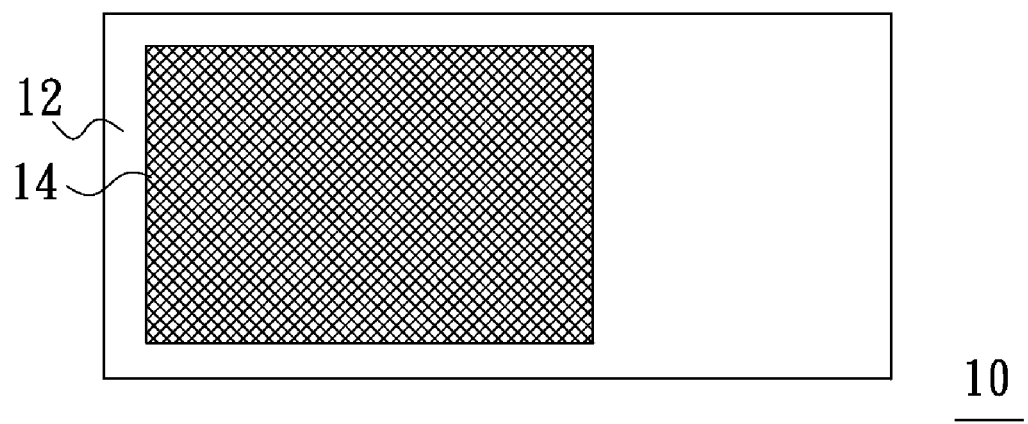
FIG. 2D is a schematic upward view illustrating a display device with touch panel according to another embodiment of the invention.

FIG. 1 is a schematic cross-sectional view illustrating a display device with touch panel according to an embodiment of the invention. Referring to FIG. 1, the display device with touch panel 10 comprises a flexible display panel 12 and a force sensitive touch panel 14 disposed under a portion of the flexible display panel 12.

The flexible display panel 12 is a reflective flexible display panel, such as an electro-phoretic display panel, a cholesteric liquid crystal display panel, an organic electroluminescence display panel, a MEMS display panel or an electro-wetting display panel. The flexible display panel 12 has a upper surface 122 and a bottom surface 124 opposite to each other. The upper surface 122 is a display surface of the flexible display panel 12.

The force sensitive touch panel 14 comprises a first substrate 142, a second substrate 144 and a plurality of piezoelectric sensors 146. The first substrate 142 is disposed above the second substrate 144 and near the bottom surface 124 of the flexible display panel 12. The piezoelectric sensors 146 are disposed between the first substrate 142 and the second substrate 144. In specific, the materials of the first substrate 142 and the second substrate 144 may be polycarbonate (so-called PC), polyethersulfone (so-called PES), polymethyl methacrylate (so-called PMMA), novolac plastic, glass or stainless steel. In addition, the piezoelectric sensor 146 may comprise force sensitive resistors.

Specially, the force sensitive touch panel 14 in this embodiment further comprises a plurality of supporting pillars 148 disposed against and between the flexible display panel 12 and the second substrate 144. The supporting pillars 148 is used for keeping the distance between the flexible display panel 12 and the force sensitive touch panel 14 to avoid the inappropriate action of the piezoelectric sensor 146 resulted from the gravity of the flexible display panel 12 before the force sensitive touch panel 14 being pressed.

It should be noted that the invention is not limited to the relative horizontal positions and the ratio of the area of the force sensitive touch panel 14 and the flexible display panel 12. As shown in FIG. 2A to FIG. 2D, the area of the force sensitive touch panel 14 may be about equal or less than a half of the area of the flexible display panel 12 and corresponding any part of the flexible display panel 12. Alternatively, the area of the force sensitive touch panel 14 may be larger than a half of the area of the flexible display panel 12. The area of the force sensitive touch panel 14 is not limited in the invention.

Figure 3:
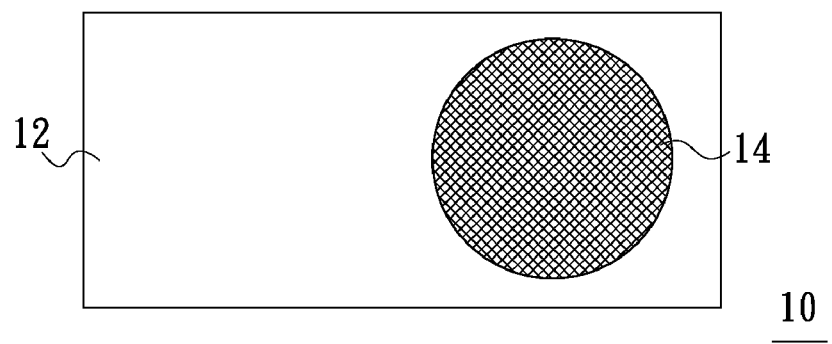
FIG. 3 is a schematic upward view illustrating a display device with touch panel according to another embodiment of the invention.
Figure 4:
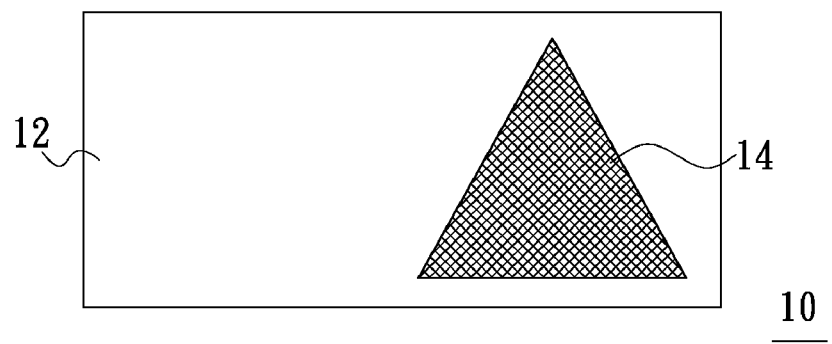
FIG. 4 is a schematic upward view illustrating a display device with touch panel according to another embodiment of the invention.

In addition, a quadrangle force sensitive touch panel 14 is taken as the example in the embodiment, but it is not only limited to the shape of the force sensitive touch panel 14. The shape of the force sensitive touch panel 14 may also be a circular or polygon shape, as shown in FIG. 3 and FIG. 4.

In the display device with touch panel 10, since the force sensitive touch panel 14 is under the flexible display panel 12, the light is transmitted into or out of the flexible panel 12 without passing through the force sensitive touch panel 14. Therefore, the energy loss of the light passing through the force sensitive touch panel 14 may be prevented. Thus, the displaying brightness of the display device with touch panel 10 is improved.

Figure 5:
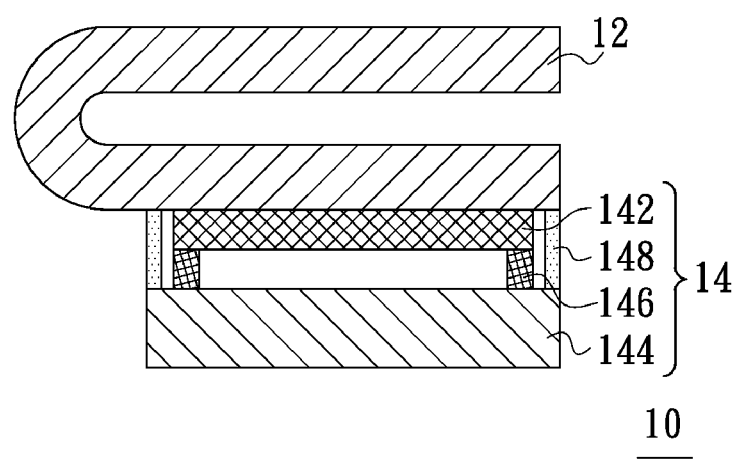
FIG. 5 is a schematic view illustrating the display device with touch panel of FIG. 1 during a bending state.

Accordingly, since the force sensitive touch panel 14 is disposed only on a portion of the flexible display panel 12, even the force sensitive touch panel 14 consists of a rigid substrate, the other portions of the flexible display panel 12 without bonding with the force sensitive touch panel 14 is also flexible, as shown in FIG. 5. Therefore, the display device with touch panel 10 is consistent with the trend of the miniaturization of the portal electronic produces.

Figure 6A:
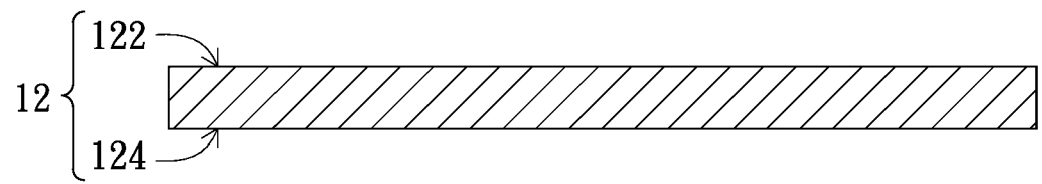
FIG. 6A to FIG. 6D are schematic cross-section views illustrating the display device with touch during partial fabricating process according to an embodiment of the invention.
Figure 6B:
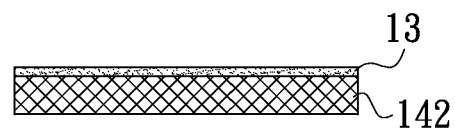
Figure 6C:
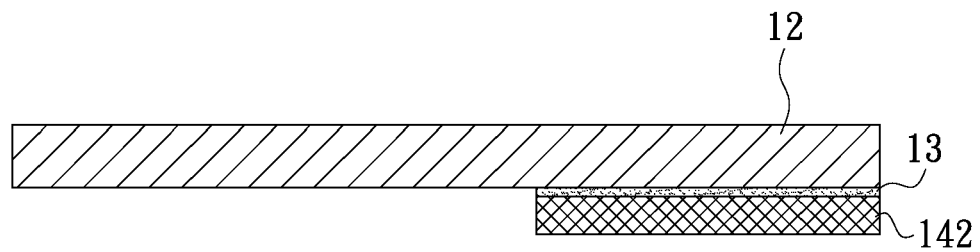

The fabricating method of the display device with touch panel of the invention is described in following paragraphs. FIG. 6A to FIG. 6D are schematic cross-section views illustrating the display device with touch panel during fabricating process according to an embodiment of the invention. Referring to FIG. 6A first, the flexible panel 12 having the upper surface 112 and the bottom surface 124 opposite to each other is provided. Then, a force sensitive touch panel 14 is formed under a portion of the flexible display panel 12. In detail, the method of forming the force sensitive touch panel 14 under a portion of the flexible display panel 12 of this embodiment comprises forming an adhesion layer 13 on a first substrate 142, as shown in FIG. 6B. Next, the first substrate 142 is adhered under a portion of the flexible display panel 12 by the adhesion layer 13, as shown in FIG. 6C.

Figure 6D:
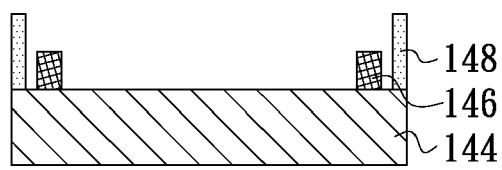
Figure 7:
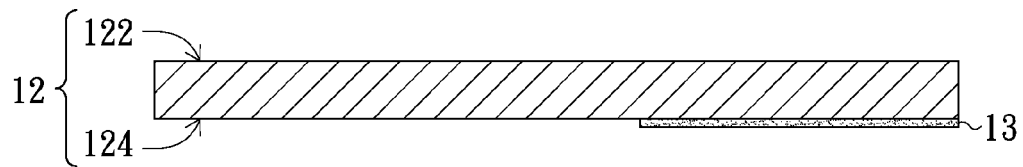
FIG. 7 is a schematic cross-section view illustrating the adhesion layer is adhered with a portion of the flexible display panel according to another embodiment of the invention.

Referring FIG. 6D, a plurality of piezoelectric sensors 146 are disposed on the second substrate 144. The piezoelectric sensors 146 may comprise force sensitive resistors. Specifically, a plurality of supporting pillars 148 are disposed on the second substrate 144 to keep the distance between the flexible display panel 12 and the force sensitive touch panel 14 in this embodiment. Finally, the second substrate 144 with the piezoelectric sensors 146 and the first substrate 142 are assembled to each other for forming the force sensitive touch panel 14. The supporting pillars 148 are disposed against and between the flexible display panel 12 and the second substrate 144 of the force sensitive touch panel 14. The flexible display panel 12 and the force sensitive touch panel 14 are assembled to form the display device with touch panel 10 as shown in FIG. 1.

Figure 8A:
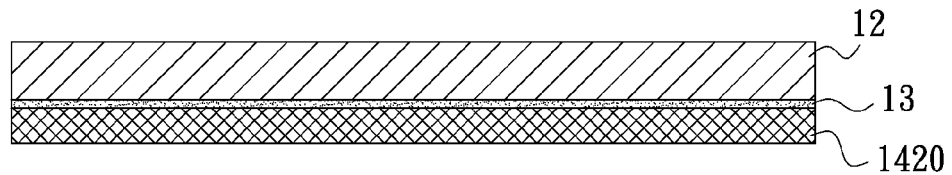
FIG. 8A to FIG. 8C are schematic cross-section views illustrating the display device with touch panel during partial fabricating process according to an embodiment of the invention.
Figure 8B:
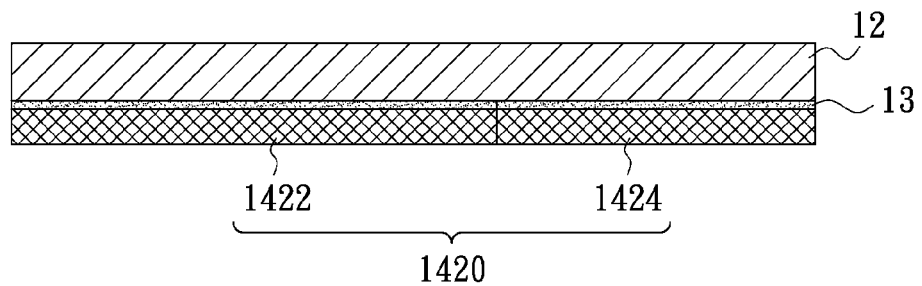
Figure 8C:
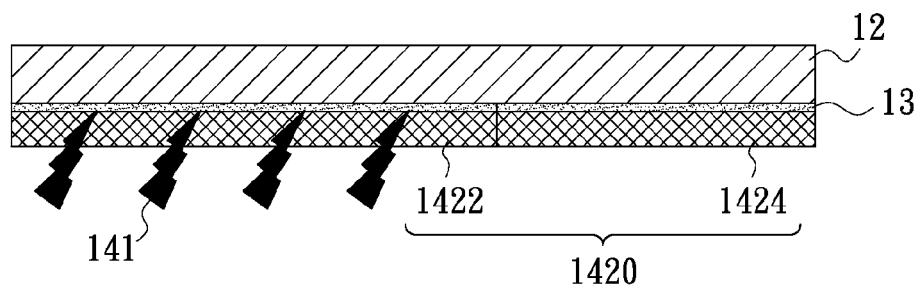

Referring to FIG. 1 and FIG. 8A to FIG. 8C, in another embodiment of the invention, the method of forming the force sensitive touch panel 14 comprises adhering a substrate 1420 under the flexible display panel 12 first, as shown in FIG. 8A. Next, a portion of the substrate 1420 is removed to form the first substrate 142 under the flexible display panel 12. In this embodiment, a portion of the substrate 1420 is removed by laser cutting method. In detail, the process of removing the portion of the substrate 1420 comprises cutting the substrate 1420 to a first partial substrate 1422 and a second partial substrate 1424 first, as shown in FIG. 8B. Next, the first partial substrate 1422 under removing is illuminated by a laser beam and then departed from the flexible display panel 12, as shown in FIG. 8C. Then, the first partial substrate 1422 departed from the flexible display panel 12 is removed and the second partial substrate 1424 adhered with the flexible display panel 12 is considered the first substrate 142. The follow-up fabricating process of the force sensitive touch panel 14 is described as the aforementioned embodiment and shown in FIG. 6D, it is unnecessary to say herein.

In summary, since the force sensitive touch panel is disposed under the flexible display panel in the invention, the light is transmitted into or out of the flexible display panel without passing through the force sensitive touch panel. Therefore, the energy loss of the light passing through the force sensitive touch panel may be prevented. Thus, the displaying brightness of the display device with touch panel is improved.

Moreover, since the force sensitive touch panel is disposed under a portion of the flexible display panel, the other portions of the flexible display panel without bonding with the force sensitive touch panel is also flexible. Therefore, the display device with touch panel is consistent with the trend of the miniaturization of the portal electronic produces.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:
1. A display device with touch panel, comprising:
 a flexible display panel;
 a force sensitive touch panel disposed under a portion of the flexible display panel, the force sensitive touch panel comprising:
  a first substrate;
  a second substrate disposed under the first substrate; and
  a plurality of piezoelectric sensors disposed between the first substrate and the second substrate;

a plurality of supporting pillars disposed against and between the flexible display panel and the second substrate.

2. The display device with touch panel as recited in claim 1, wherein the flexible display panel is a reflective flexible display panel.

3. The display device with touch panel as recited in claim 1, wherein the flexible display panel is an electro-phoretic display panel, a cholesteric liquid crystal display panel, an organic electroluminescence display panel, a MEMS display panel or an electro-wetting display panel.

4. The display device with touch panel as recited in claim 1, wherein the shape of the force sensitive touch panel is circle or polygon.

5. The display device with touch panel as recited in claim 1, wherein the materials of the first substrate and the second substrate are polycarbonate, polyethersulfone, polymethyl methacrylate, novolac plastic, glass or stainless steel.

6. The display device with touch panel as recited in claim 1, wherein the piezoelectric sensors comprises force sensitive resistors.

7. A fabricating method of a display device with touch panel comprising the steps of:
providing a flexible display panel; and
forming a force sensitive touch panel under a portion of the flexible display panel, comprising the steps of:
providing a first substrate;
forming an adhesion layer on the first substrate, or forming an adhesion layer under the portion of the flexible display panel;
adhering the first substrate under the portion of the flexible display panel by the adhesion layer;
disposing a plurality of piezoelectric sensors on the second substrate;
forming a plurality of supporting pillars on the second substrate;
assembling the second substrate with the piezoelectric sensors to the first substrate; and
disposing the supporting pillars against and between the second substrate and the flexible display panel.

8. A fabricating method of a display device with touch panel comprising the steps of:
providing a flexible display panel; and
forming a force sensitive touch panel under a portion of the flexible display panel, comprising the steps of:
adhering a substrate under the flexible display panel;
removing a portion of the substrate for forming a first substrate under the flexible display panel, comprising the steps of:
cutting the substrate;
illuminating the portion of the substrate under removing by a laser beam; and
removing the portion of the substrate illuminated by the laser beam;
disposing a plurality of piezoelectric sensors on a second substrate; and
assembling the second substrate with the piezoelectric sensors to the first substrate.

9. A fabricating method of a display device with touch panel comprising the steps of:
providing a flexible display panel; and
forming a force sensitive touch panel under a portion of the flexible display panel, comprising the steps of:
adhering a substrate under the flexible display panel;
removing a portion of the substrate for forming a first substrate under the flexible display panel;
disposing a plurality of piezoelectric sensors on a second substrate;
forming a plurality of supporting pillars on the second substrate;
assembling the second substrate with the piezoelectric sensors to the first substrate; and
disposing the supporting pillars against and between the second substrate and the flexible display panel.

* * * * *